US008113691B2

(12) United States Patent
Jurik

(10) Patent No.: US 8,113,691 B2
(45) Date of Patent: Feb. 14, 2012

(54) COLOR CHANGE MECHANISM

(75) Inventor: Pavel Jurik, Postredni Becva (CZ)

(73) Assignee: ROBE Lighting s.r.o., Ra Znov pod Radhostem (CZ)

( * ) Notice: Subject to any disclaimer, the term of this patent is extended or adjusted under 35 U.S.C. 154(b) by 563 days.

(21) Appl. No.: 12/075,465

(22) Filed: Mar. 11, 2008

(65) Prior Publication Data

US 2009/0231854 A1 Sep. 17, 2009

(51) Int. Cl.
*F21V 9/10* (2006.01)
*G02B 5/22* (2006.01)

(52) U.S. Cl. ........ 362/293; 362/281; 362/283; 362/284; 362/323; 362/324; 359/889

(58) Field of Classification Search .................. 362/293, 362/280–284, 322–324; 359/889, 890
See application file for complete search history.

(56) References Cited

U.S. PATENT DOCUMENTS 2,133,608 A 10/1938 Engelken
2,240,297 A * 4/1941 Haupt et al. .................. 362/281
2,346,988 A * 4/1944 Noel ............................ 362/281
2,670,400 A * 2/1954 Grunwald ..................... 359/889
2,960,911 A * 11/1960 Coote et al. .................. 359/889
3,883,243 A * 5/1975 Weisglass et al. .............. 355/35
4,018,527 A * 4/1977 Bartel et al. .................... 355/71
4,043,645 A 8/1977 Fazzari
4,392,187 A 7/1983 Bornhorst
4,435,075 A * 3/1984 Payrhammer et al. .......... 355/35
4,600,976 A 7/1986 Callahan
4,602,321 A 7/1986 Bornhorst
4,745,531 A 5/1988 Leclerq
4,800,474 A 1/1989 Bornhorst
4,890,208 A 12/1989 Izenour
4,893,225 A * 1/1990 Solomon ....................... 362/293
4,897,770 A 1/1990 Solomon
4,984,143 A 1/1991 Richardson
5,188,452 A 2/1993 Ryan
5,426,576 A 6/1995 Hewlett
5,515,254 A 5/1996 Smith et al.
5,790,329 A 8/1998 Klaus et al.
5,969,868 A 10/1999 Bornhorst et al.
6,142,652 A 11/2000 Richardson
6,520,662 B1 2/2003 Dedoro
6,578,987 B1 6/2003 Hough et al.
6,623,144 B2 9/2003 Bornhorst
6,687,063 B1 2/2004 Rasmussen et al.
6,796,682 B2 9/2004 Hough et al.
6,796,683 B2 9/2004 Wood et al.
(Continued)

FOREIGN PATENT DOCUMENTS

EP 1158239 11/2001
(Continued)

*Primary Examiner* — Alan Cariaso

(57) ABSTRACT

The present invention provides a drive system for an optical light modulation system employing multiple light modulation element pairs. The each pair is driven by a single motor which drives one axis around which one element of the first pair rotates while the other element of the first pair free floats and rotates about a second axis. While the second axis drives the rotation of the first element of the second pair and the first axis provides a rotation pivot for the second element of the second pair. Thus the two pairs share the two axises providing a more compact drive system that can be used more flexibly in an optical train of an automated multiparameter lighting system.

19 Claims, 8 Drawing Sheets

U.S. PATENT DOCUMENTS

| | | | |
|---|---|---|---|
| 7,163,317 B2 | 1/2007 | Warnecke et al. | |
| 7,226,188 B2 | 6/2007 | Hough | |
| 7,537,360 B2 * | 5/2009 | Allegri | 362/282 |
| 2001/0055209 A1 | 12/2001 | Dedoro | |
| 2007/0211468 A1 | 9/2007 | Allegri | |

FOREIGN PATENT DOCUMENTS

| | | |
|---|---|---|
| EP | 1158240 | 11/2001 |
| EP | 1234197 | 8/2002 |
| EP | 1832807 A1 | 9/2007 |
| GB | 629266 | 9/1949 |
| WO | WO-2007/122459 | 11/2007 |

* cited by examiner

COLOR CHANGE MECHANISM

TECHNICAL FIELD OF THE INVENTION

The present invention generally relates to the color control of lighting systems and more specifically to mechanisms used for color control of entertainment lighting automated multiparameter luminaires.

BACKGROUND OF THE INVENTION

Luminaires with automated and remotely controllable functionality are well known in the entertainment and architectural lighting markets. Such products are commonly used in theatres, television studios, concerts, theme parks, night clubs and other venues. As well as usually providing control over the pan and tilt functions of the luminaire allowing the operator to control the direction the luminaire is pointing a typical product will also often provide control over the color of the emitted light beam. Typically this color control is done via the movement of color wheels, flags or other similar device containing colored filters. Very often these colored filters are gradated from one end to the other with an increasing density of the color filter or increasing saturation of the color that is being filtered. Typically, in these systems the light beam only passes through a portion of the filter. By moving the gradated filter so that different portions of the filter are placed in the path of the light beam the color saturation of the light beam can be varied.

FIG. 1 shows a filter of this kind with a gradated saw-tooth color coating 101. Filter 101 is progressively moved from into the path of the light beam cross section 102 in the light train of the luminaire anywhere from position a to d. As the movement continues from position a to d an increasing portion of the light beam cross section 102 passing through the color modulating portions 103 (shown as the hatched area in FIG. 1) of filter 101 and thus the resultant light becomes more and more color saturated. When the filter 101 is in position d the entire cross section 102 passes through the color modulating portions 103 the filter 101 and the color saturation is complete for that filter.

Although a rectangular filter 101 is shown here with linear motion it is also common for these devices to use circular filters with a rotary motion.

A single filter 101 is illustrated here, however in practice multiple color filters with the same or different color modulating properties may be used so that the light passes through or bypasses each filter in turn. Such an arrangement creates a subtractive color mixing system where the color of the output light is defined by the combination and position of all the filters in use. The products manufactured by Robe Show Lighting such as the ColorSpot 1200E are typical of the art.

In typical color modulation systems a combination of two or more of these variable saturation mechanisms, one after the other in the optical train with different colored filters to provide a variable color mixing system across a color gamut.

It is very common to use three color filters, one each of Cyan, Magenta and Yellow each of variable saturation. Combining these in varying subtractive mixes allows the production of a very wide gamut of colors.

Lighting designers and other users of such products often have a desire to change colors very rapidly. Quickly enough that the audience does not perceive the change happening and instead sees it as an instantaneous event. The speed of these changes are typically limited by the mechanical design and construction of the mechanism used for the color change.

FIG. 2 illustrates a typical multiparameter automated luminaire system 10. These systems typically include a plurality of multiparameter automated luminaires 12 which typically each contain on-board a light source (not shown), light modulation devices, electric motors coupled to mechanical drives systems and control electronics (not shown). In addition to being connected to mains power either directly or through a power distribution system (not shown), each luminaire is connected is series or in parallel to data link 14 to one or more control desks 16. The luminaire system is typically controlled by an operator through the control desk 15.

FIG. 3 illustrates different levels of control 20 of a parameter of the light emitted from a luminaire. In this example the levels are illustrated for one parameter: color. The first level of control 22 is the user who decides what he wants and inputs information into the control desk through typical through computer human user interface(s) 24. The control desk hardware and software then processes the information 26 and sends a control signal to the luminaire via the data link 14. The control signal is received and recognized by the luminaire's on-board electronics 28. The onboard electronics typically includes a motor driver 30 for the color motor (not shown). The motor driver 30 converts a control signal into electrical signals which drive the movement of the color motor. The color motor is part of the color mechanical drive 32. When the motor moves it drives the mechanical drive 32 to move the mechanical components which cause the light beam emanating from the luminaire to change color.

In some systems it may be possible that the motor driver 30 is in the control desk rather than in the luminaire 12 and the electrical signals which drive the motor are transmitted via an electrical link directly to the luminaire. It is also possible that the motor driver is integrated into the main processing within the luminaire 12. While many communications linkages are possible, most typically, lighting control desks communicate with the luminaire through a serial data link; most commonly using an industry standard RS485 based serial protocol called commonly referred to as DMX-512.

Particular problems inhibiting and limiting the speed, accuracy and repeatability of the movements of the color system of an automated luminaire are the mechanical stiffness and inertia of the color mechanism and its drive system. It is typical in such products to use a single motor or a pair of motors connected to the driven color change mechanism through either a belt drive or through a direct geared system. As well as the stated problems in both cases there is inevitably an amount of backlash or slippage or shifting which induces hysteresis in the system. Such hysteresis would manifest itself as an undesirable and visible color shift in the light output.

Various prior art systems have offered solutions to these problems. One solution to reducing the time needed for a color change is to reduce the length of travel of the mechanism. However compressing the length of the graded filter (component 101 in FIG. 1) may have the unintended side effect of making the light field uneven as the color saturation density on one side of the aperture may be significantly different than on the other.

There is a need for a color change system which can provide rapid and accurate movement without backlash and hysteresis.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention generally relates to the color control of lighting systems and more specifically to mechanisms used for color control of entertainment lighting automated multiparameter luminaires.

The present invention relates to the mechanisms for driving the color filters in a color mixing system. In one embodiment the present invention utilizes a single motor for each color driving a pinion gear. The pinion gear engages with two further pinion gears to which individual color flags are attached. The axles on which the second and third pinion gears are mounted are rigidly supported with a bearing at each end of the axle between two mounting plates. The mechanical system formed is mechanically stiff and allows rapid movement of the flags with little hysteresis and vibration in very little space.

Figure 1:
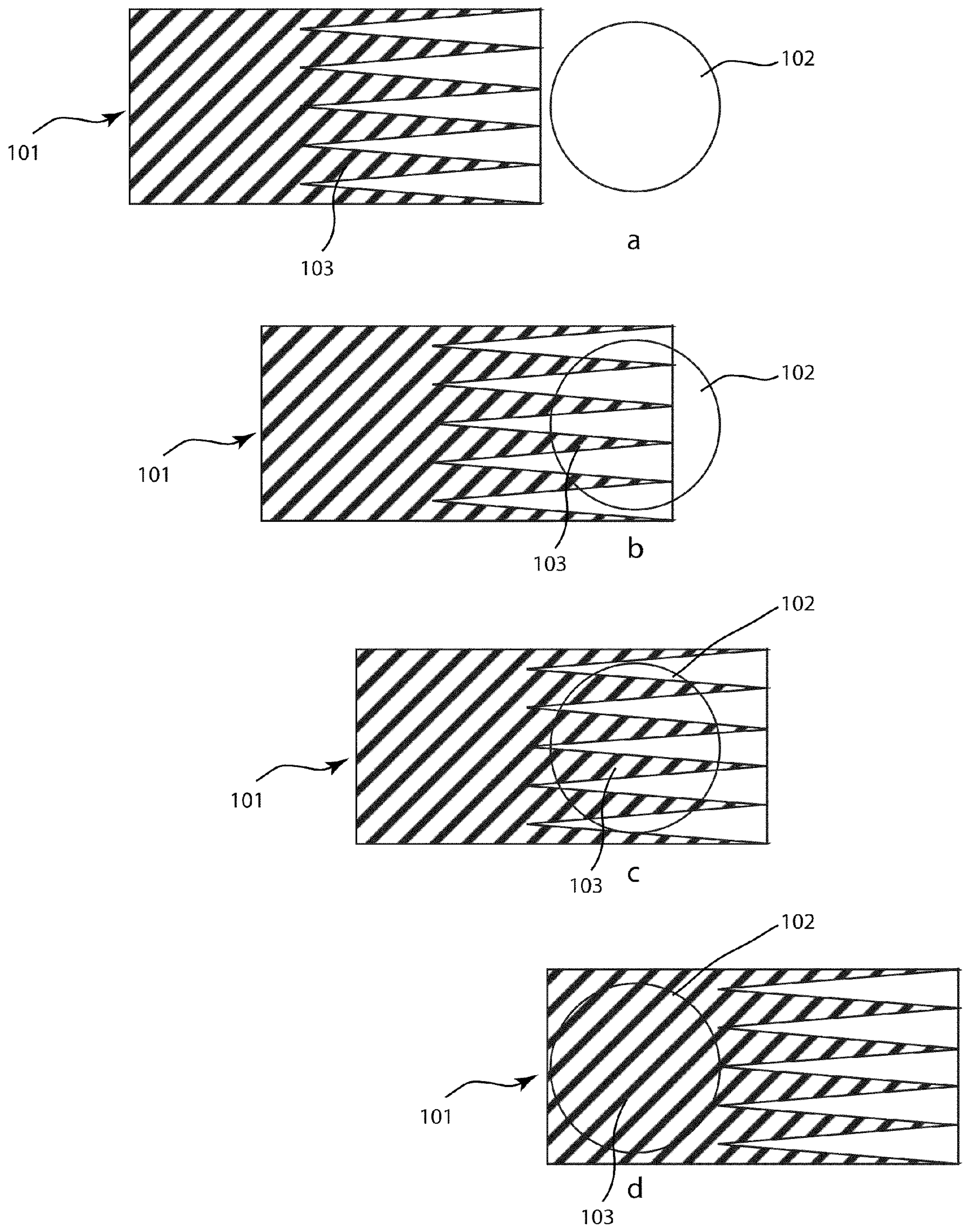
FIG 1 (Prior Art)
FIG. 1 illustrates a color mixing system of a multiparameter automated luminaire
Figure 2:
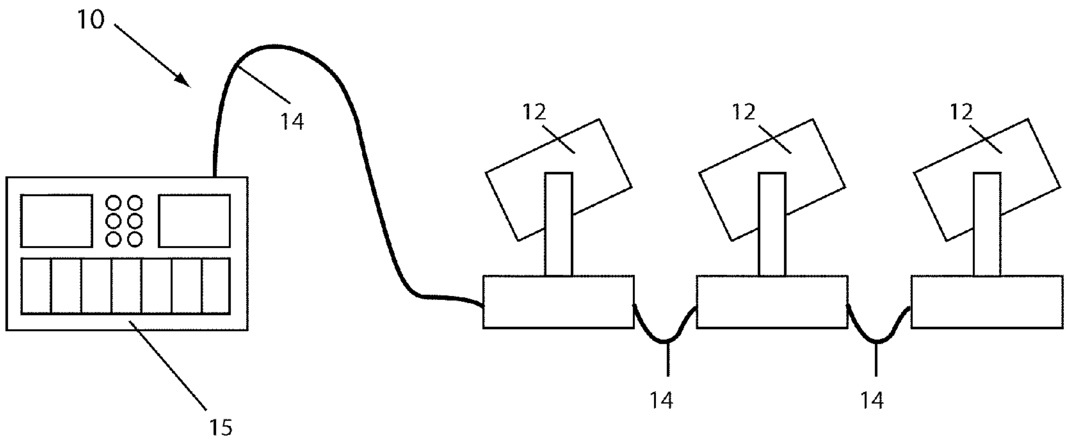
FIG 2 (Prior Art)
FIG. 2 illustrates a multiparameter automated luminaire lighting system.
Figure 3:
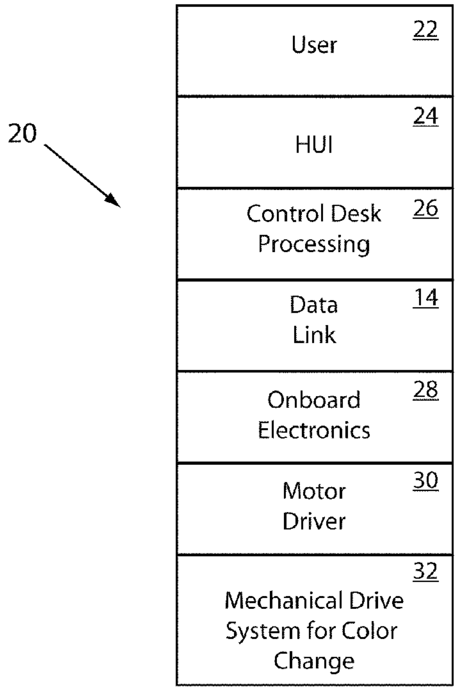
FIG 3 (Prior Art)
FIG. 3 illustrates an example of the levels of control which may be seen in controlling a parameter of an automated luminaire.
Figure 4:
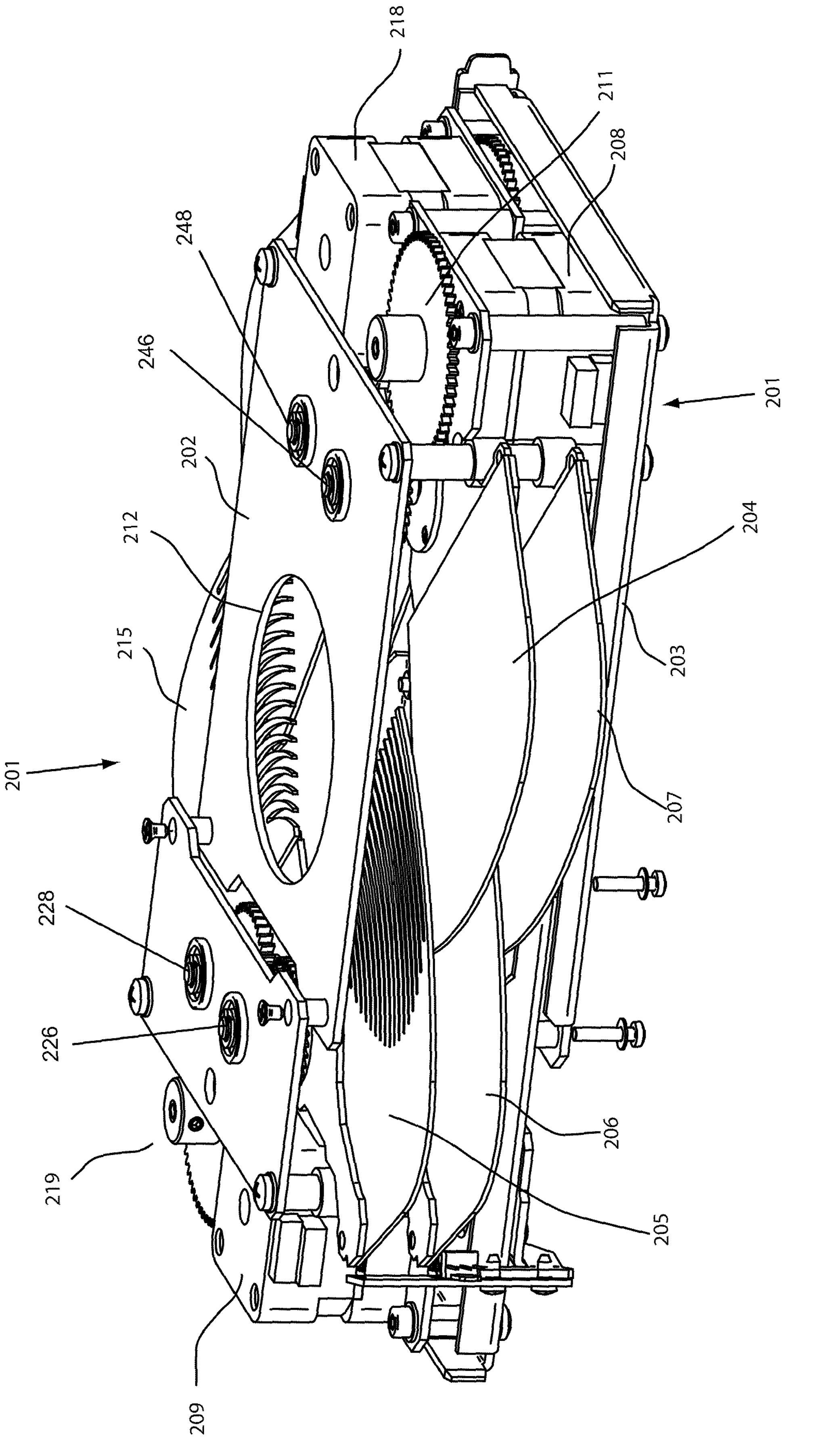
FIG. 4 illustrates an exemplary embodiment of the mechanical elements of an embodiment of the present invention.

FIG. 4 illustrate the major mechanical components of the color changing system 201 of one embodiment of the present invention. The assembly is based around two rigid mounting plates 202 and 203. Each of these mounting plates has a light aperture 212. The two apertures 212 are axially aligned. Attached to the mounting plates are motors 208, 218, 209, 219 (motor 219 is hidden in FIG. 4 but shown in FIG. 5 and FIG. 6). The type of motor used is not important to the invention—the motors may include but are not limited to stepper motors, DC motors, AC motors or other types of motors.

Figure 5:
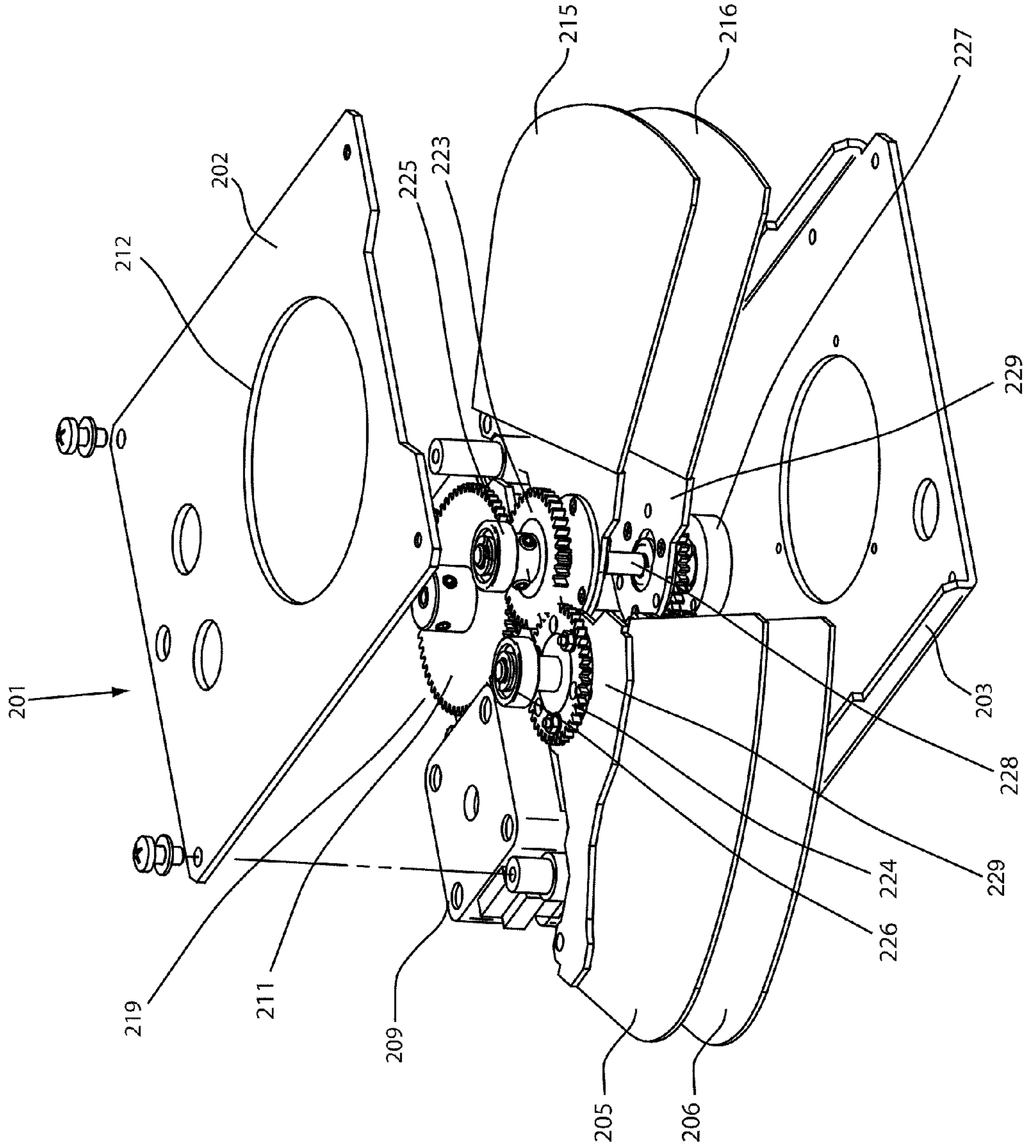
FIG. 5 illustrates an partially exploded diagram of the left half of the embodiment illustrated in FIG. 4.
Figure 6:
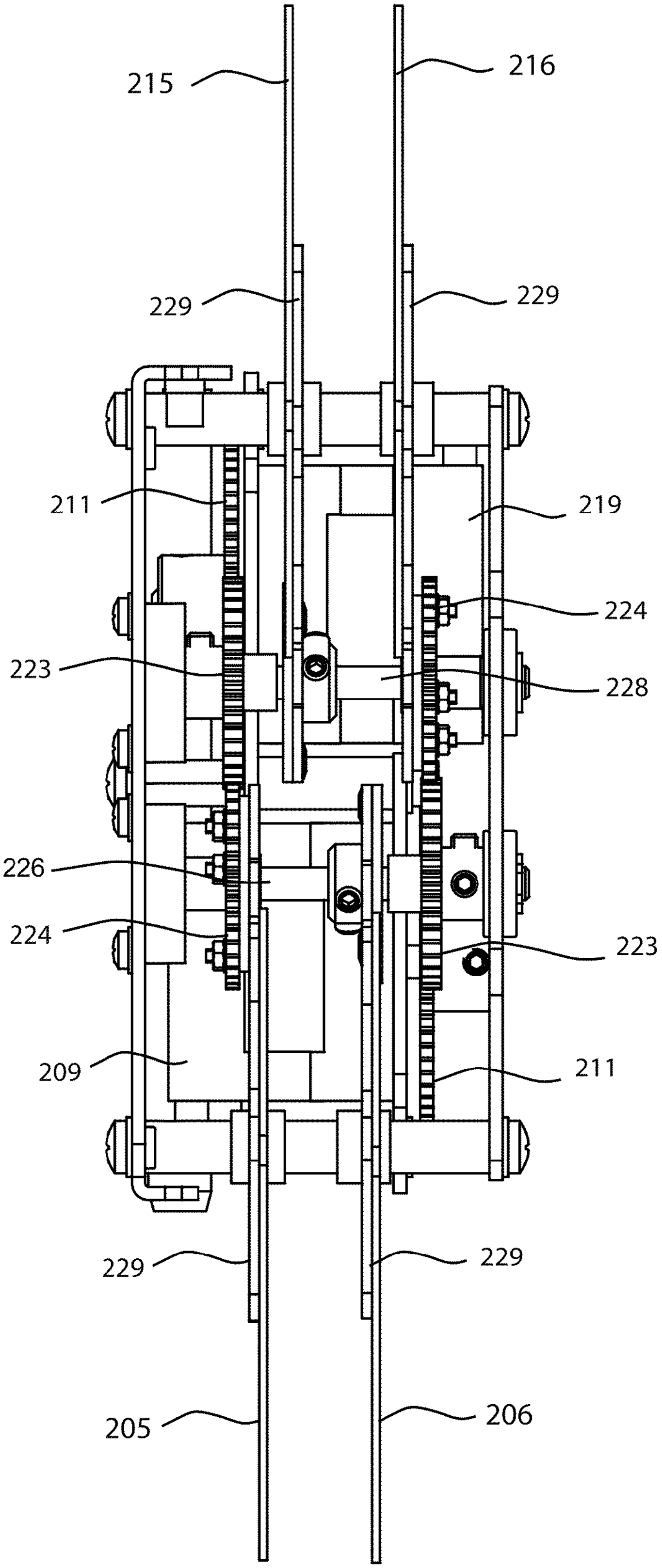
FIG. 6 illustrates an elevation for the FIG. 5 illustrated portion of the embodiment illustrated in FIG. 4.

Each motor 208, 218, 209 and 219 drives a pair of light modulators: one motor 208 drives a modulator pair 204 (the other is hidden); another motor 218 drives another light modulation pair 207 (the other is hidden); the third motor 209 drives a third set of modulation pair 206 and 216; the fourth motor 219 drives a fourth pair 205 and 215 (modulator 216 is hidden in FIG. 4 but shown in FIG. 5 and FIG. 6).

The different light modulator pairs typically have different modulating effects when introduced to the light beam. In one embodiment one pair is a pair of cyan filters, a second pair is a pair of magenta filters, a third pair is a pair of yellow filters and the fourth pair provides color temperature correction (for example to make the light beam generated by a metal halide lamp appear to have the color temperature of an incandescent lamp). Other modulators are also possible—like a dimmer or other types of modulators. It is not strictly necessary for there to be a pair of modulators only one modulator may be employed instead of a pair however, the unilateral arrangement compromises some of the benefits such as more even color distribution and lack of vibration or other movement effects due to unbalanced inertial changes due to rapid movement of the modulator as further described herein.

FIG. 5 illustrates a partially exploded view of the left hand portion of the system driven by motors 209 and 219 for two of the pairs of modulators 206, 216 and 205, 215 respectively in the embodiment illustrated in FIG. 4. FIG. 6 illustrates an elevation view of the partial illustration of FIG. 5. The following applies as well for the pairs from FIG. 4 not shown in FIG. 5 and FIG. 6. Each motor 209 and 219 has a geared driving pinion 211 on its output shaft. The driving pinion 211 engages with a first driven pinion 223 which, in turn, engages with a second driven pinion 224. Driven pinions 223 and 224 are the same size. In the system illustrated driven pinions 223 and 224 are smaller than driving pinion 211 thus providing a gearing increase. Such a gearing system may be advantageous for reasons of speed of movement however it is not a requirement for the present invention. In the embodiment illustrated the first driven pinion 223 is fixed to axle 228 and second driven pinion 224 is free to rotate around axle 228. Axle 228 is free to rotate in bearings 225 and 227 mounted in the top and bottom support plates 202 and 203 respectively. The mountings of the bearings in the support plates is rigid providing secure support for the axle 228 at both ends which in turn provides a backlash and vibration free support for the driven pinion 223.

A flag support arm 229 is attached to the driven pinion 224. Each flag support arm supports a color mixing filter flag 205, 215, 206, 216. The color mixing filter flags are mounted in pairs of the same color: thus 205 and 215 are one color and 206 and 216 are a second, different, color. For example one half of each flag pair 206 is mounted on a driven pinion 223 and the second half of each flag pair 216 for example) is mounted on the associated driven pinion 224. In this manner each axle supports two driven pinions for two different colors. Each axle will have, on one end, a driven pinion which is fixed to axle and has a flag of a first color and, at the other end of the axle, a driven pinion which is free to rotate around axle and has a flag of a second color. This combination and re-use of a single axle for two flags of different colors halves the total number of axles and provides an improved compact system. The assembly is constructed as two, virtually identical subassemblies which are mounted face-to-face sharing axles (226, 228 facing 246, 248) and are interlaced as shown in FIG. 4.

It can be seen from FIG. 5 that rotation of driving pinion 211 in a clockwise direction will cause rotation of driven pinion 223 in a counter clockwise direction which in turn will cause rotation of driven pinion 224 in a clockwise direction. Thus driven pinions 223 and 224 along with their attached flag support arms and color mixing filter flags 205 and 215 will be driven in contrary directions and will open and close across apertures 212 in the mounting plates 202 and 203.

The disclosed system has a number of advantages over the prior art. Firstly the distance traveled by each of the two color mixing filter flags forming a pair is half that of a single plate system thus reducing the time for the system to operate. Additionally the use of two color mixing flags acting in opposition improves the evenness of the color mixing across the aperture. This provides for a great deal more flexibility in the positioning of the system within any given optical light train while its compact size allows for much greater flexibility in the light train designs into which it can be incorporated. This flexibility allows for more compact design of the overall automated luminaire fixture.

Figure 7:
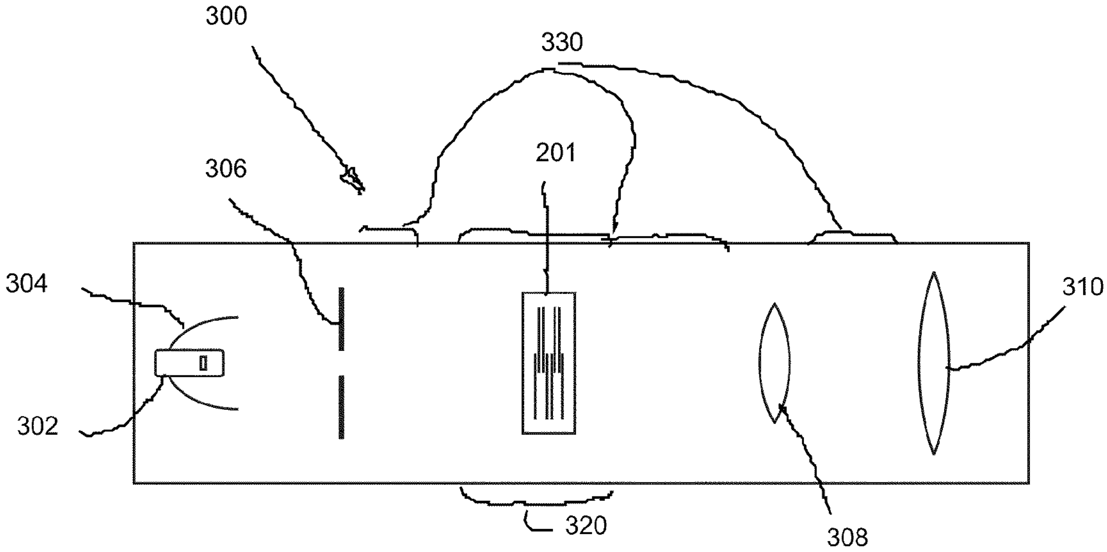
FIG. 7 illustrates on example of an optical train and how the improved color mixing system can be used over a greater range than prior color mix systems.

FIG. 7 illustrates how the more compact design and balanced entry from opposite sides of the light beam allows the present color mixing system to be used over a greater range along the optical train of a luminaire 300. The luminaire's light train is made up of a number of components such as the lamp 302, lamp reflector 304, aperture 306 and a series of lenses 308, 310. The present inventions ranges of usefulness 330 are wider since they can be placed closer to a focal plain then many prior art color mixing systems which have a more limited range of usefulness 320.

Figure 8:
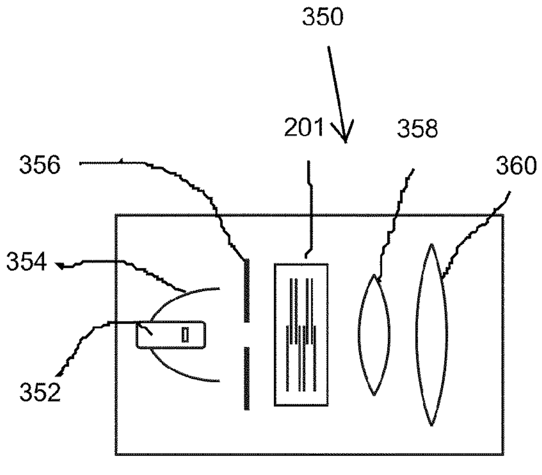
FIG. 8 illustrates on example of an optical train and how the improved color mix system allows for an over all more compact fixture/luminaire

FIG. 8 illustrates another example of the usefulness of the present compact design. In this case the overall dimensions of the luminaire 350 can be more compact because the color mixing system 201 can be placed closer to a focal plain in the optical train of the luminaire 350.

Figure 9:
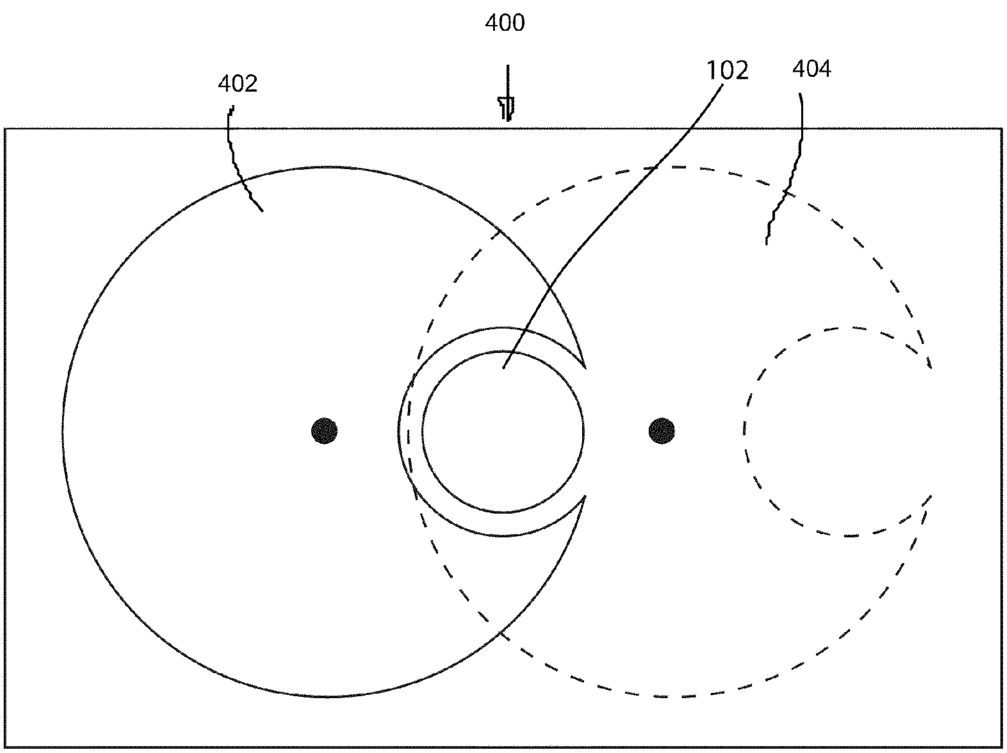
FIG 9 (Prior Art)
FIG. 9 illustrates an example of a prior art color mix system as viewed along the optical axis of the system.
Figure 10:
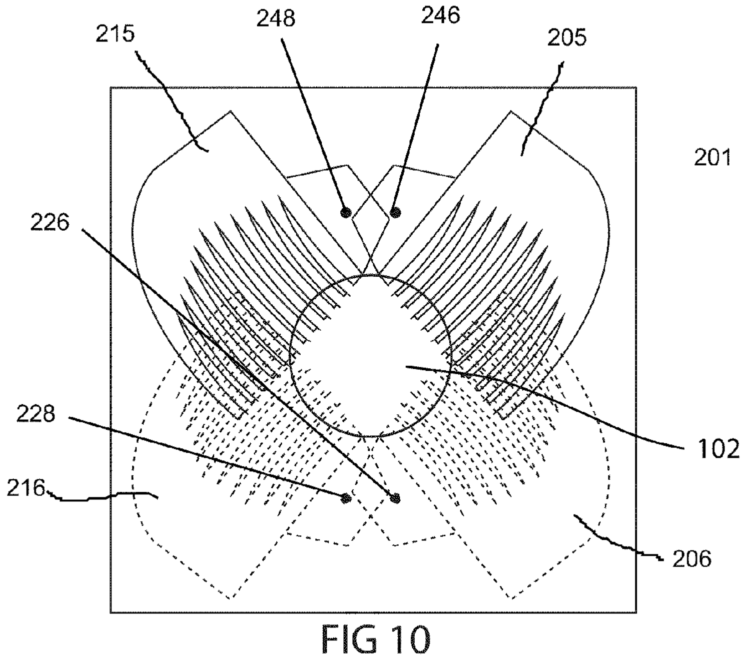
FIG. 10 illustrates an example of the improved color mix system as viewed along the optical axis of the system.
Figure 11:
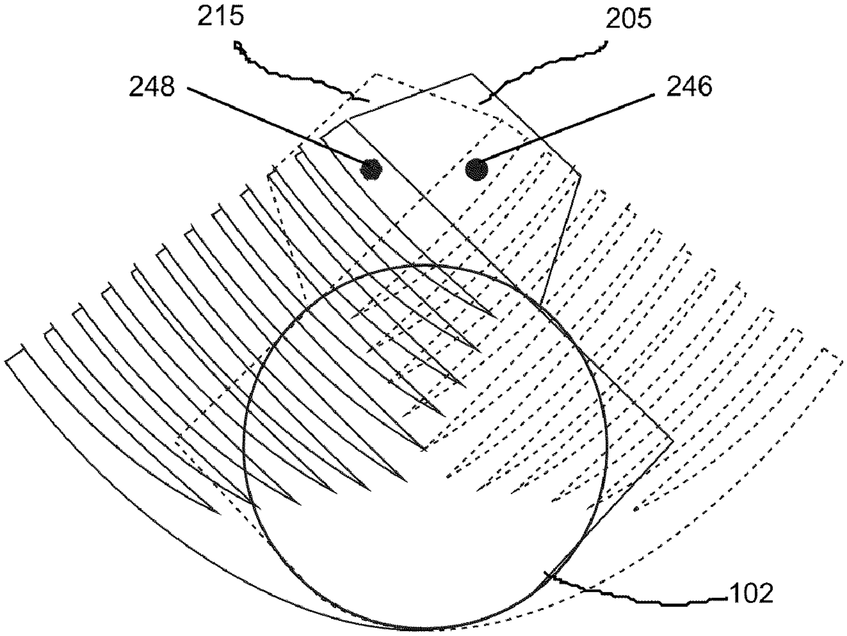
FIG. 11 illustrates a color mix pair in full saturation.
Figure 12:
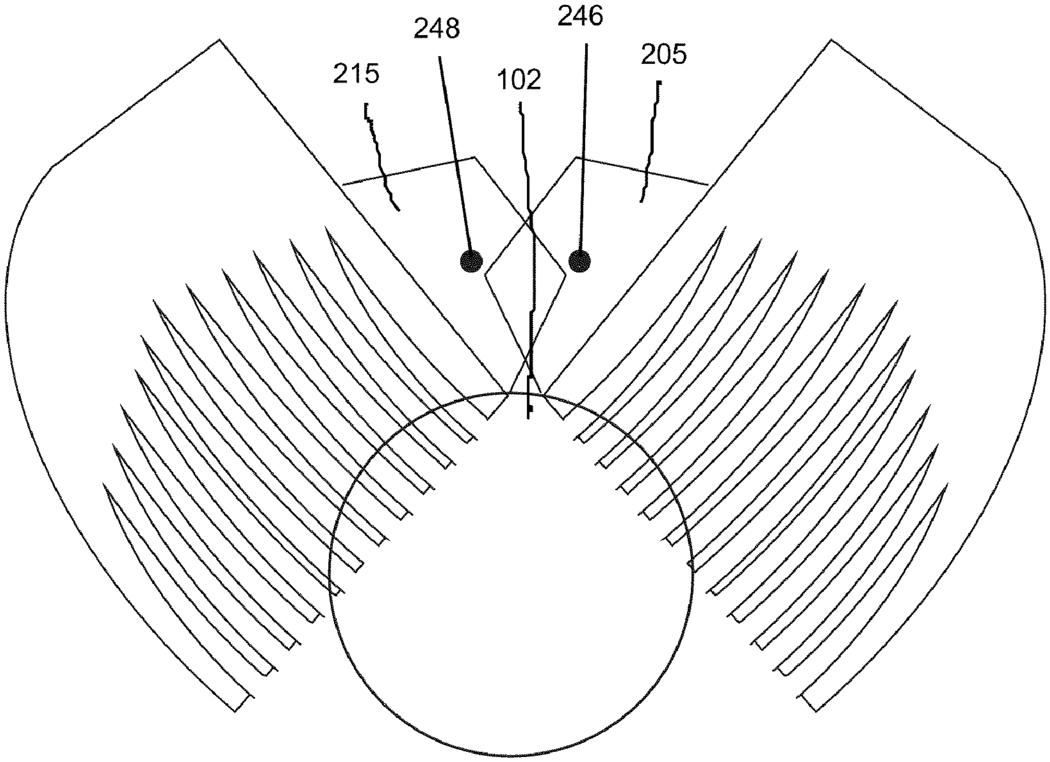
FIG. 12 illustrates a color mix pair just entering the light beam.

FIG. 9 illustrates a prior art color mixing system with gradated color wheels 402 and 404. While FIG. 10 illustrates the more compact design of the present color mixing system. In this view it is clear to see how much more compact the present system is in comparison to prior art systems.

Further because the motion of the two color mixing flags forming a pair is always equal and opposite there is no net inertial, vibrational or oscillatory movement induced into the mounting frames and the rest of the luminaire. Further a mechanically stiff system with rigidly supported axles and fully engaged pinion gears ensures accurate movement with little or no hysteresis or overshoot. Further the sharing of the axles by two color flags halves the number of axles and produces a compact system. Further the combination of a fixed pinion and a rotational pinion on a single shaft reduces the number of bearings in the system.

In a further embodiment both pinions 223 and 224 may be free to rotate on the axle. Both instances of the first driven pinions 223 and second driven pinions 224 are free to rotate around axles 228.

While the invention has been described with respect to a limited number of embodiments, those skilled in the art, having benefit of this invention, will appreciate that other embodiments may be devised which do not depart from the scope of the invention as disclosed herein. Accordingly, the scope of the invention should be limited only by the attached claims.

The invention has been described in detail, it should be understood that various changes, substitutions and alterations can be made hereto without departing from the spirit and scope of the invention as described by the appended claims.

What is claimed is:

1. A luminaire comprising:
- a light source for generating a light beam;
- a first overlapping pair of light color modulation filters driven in opposing rotational directions by a first motor;
- a second overlapping pair of light color modulation filters driven in opposing rotational directions by a second motor;
- a first rotational axle shared by one light color modulation filter from the first light color modulation filter pair and one light color modulation filter from the second light color modulation filter pair where rotation of the first axle is driven by the first motor and drives the rotation of the light color modulation filter from the first light color modulation filter pair that shares the first axle while the light color modulation filter from the second pair that shares the first axle floats on the axle and is not driven by rotation of the first axle;
- a second rotational axle shared by one light color modulation filter from the first light color modulation filter pair and one light color modulation filter from the second light color modulation filter pair where rotation of the second axle is driven by the second motor and drives the rotation of the light color modulation filter from the second light color modulation filter pair that shares the second axle while the light color modulation filter from the first pair that shares the second axle floats on the axle and is not driven by rotation of the second axle.

2. A luminaire comprising:
- a light source for generating a light beam;
- a first pair of light modulators driven by a first motor in opposing rotational directions;
- a second pair of light modulators driven by a second motor in opposing rotational directions; and
- a pair of rotation axles shared by the first and second pair of light modulators.

3. The luminaire in claims 2 where the first motor drives rotation of a first axle of the pair of rotational axles.

4. The luminaire in claim 3 where the second motor drives rotation of a second axle of the pair of rotational axles.

5. The luminaire in claim 2 where the pair of rotational axles are a first axle and a second axle and a first light modulator in the first light modulator pair shares the first axle with a first light modulator in the second light modulator pair.

6. The luminaire in claim 5 where a second light modulator from the first light modulator pair shares the second axle with a second light modulator from the second light modulator pair.

7. The luminaire in claim 5 where the first light modulator from the first light pair is driven by rotation of the first axle.

8. The luminaire in claim 7 where the first light modulator from the second light modulator pair is not driven by rotation of the first axle.

9. The luminaire in claim 2 where at least one of the light modulator pairs modulate the color of the light beam.

10. The luminaire in claim 9 where the both modulators in a pair are of the same color modulation.

11. The luminaire of claim 2 further comprising:
- a third pair of light modulators driven by a third motor in opposing rotational directions;
- mounted on a third rotational axle and a fourth rotational axle.

12. A luminaire comprising:
- a light source for generating a light beam;
- a first pair of interleaved light modulators and a second interleaved pair of light modulators which share a first rotational axle and second rotational axle;
- a third pair of interleaved light modulators which mounted on a third rotational axle and a fourth rotational axle in such manner that the third pair of light modulators are interleaved between the first pair of light modulators and the second pair of light modulators; and
- where each light modulator in the first light modulator pair moves in opposite rotational directions when driven by the first motor.

13. A luminaire of claim 12 further comprising a fourth pair of interleaved light modulators which share the third rotation axle and fourth rotational axle with the third pair of light modulators.

14. The luminaire in claim 12 where each light modulator in the second light modulator pair moves in opposite rotational directions when driven by the second motor.

15. The luminaire in claim 14 where a first light modulator in the first light modulator pair shares the first axle with a first light modulator in the second light modulator pair.

16. The luminaire in claim 15 where rotation of the first axle is driven by a first motor and rotation of the first axle drives the rotation of the first light modulator of the first light modulator pair that shares the first axle.

17. The luminaire in claim 16 where the second light modulator of the second light modulator pair is not driven by rotation of the first axle.

18. The luminaire in claim 12 where at least one of the light modulator pairs modulate the color of the light beam.

19. The luminaire in claim 18 where the both modulators in a pair are of the same color modulation and fully modulate the entire light beam.

* * * * *